United States Patent [19]
Quintile et al.

[11] Patent Number: 5,145,020
[45] Date of Patent: Sep. 8, 1992

[54] SUSPENSION FOR SEAT OF POWERED WHEEL CHAIR

[75] Inventors: Mark J. Quintile, Brunswick; Neal J. Curran, Lakewood, both of Ohio

[73] Assignee: Invacare Corporation, Elyria, Ohio

[21] Appl. No.: 612,795

[22] Filed: Nov. 14, 1990

[51] Int. Cl.$^5$ ............................ B60K 1/00; B60N 2/54
[52] U.S. Cl. .................... 180/65.1; 180/907; 248/584; 267/221; 280/304.1; 297/DIG. 4
[58] Field of Search ............ 180/65.1, 65.6, 907; 280/250.1, 304.1, 302, 6.5; 248/580, 584, 592; 267/221, 225; 297/DIG. 4

[56] References Cited

U.S. PATENT DOCUMENTS

| | | | |
|---|---|---|---|
| 521,463 | 6/1894 | Smith-Fraser | 280/250.1 X |
| 1,200,379 | 10/1916 | Lunsford | 180/907 X |
| 2,448,992 | 9/1948 | Love et al. | 180/907 X |
| 2,641,308 | 6/1953 | Bock | 248/584 X |
| 2,840,140 | 6/1958 | Harrington | 248/584 X |
| 4,310,167 | 1/1982 | McLaurin | 280/250.1 X |
| 4,455,031 | 6/1984 | Hosaka | 280/250.1 |
| 4,544,200 | 10/1985 | Dunn et al. | 297/DIG. 4 X |
| 4,592,562 | 6/1986 | Strautnieks et al. | 280/250.1 |
| 4,641,848 | 2/1987 | Ayers | 297/DIG. 4 X |
| 4,832,402 | 5/1989 | Zund | 297/302 |
| 4,889,384 | 12/1989 | Sulzer | 297/302 |
| 4,909,472 | 3/1990 | Piretti | 297/302 X |
| 5,004,259 | 4/1991 | Ayers et al. | 280/250.1 X |
| 5,042,607 | 8/1991 | Falkenson et al. | 180/907 X |

OTHER PUBLICATIONS

Garant 23 und 24, Elektromobile der S-Klasse, Invacare Deutschland GMBH.
Owners Manual, Powerchair 23S-23SI-23SR Series.
Elektromobile der S-Klasse, Garant 23 und 24, Invacare Deutschland GMBH.

*Primary Examiner*—Charles A. Marmor
*Assistant Examiner*—Brian L. Johnson
*Attorney, Agent, or Firm*—Fay, Sharpe, Beall, Fagan, Minnich & McKee

[57] ABSTRACT

A suspension system for a wheelchair comprises a frame, a pivot bar mounted to the frame through a hinge point, and a seat mounted on the pivot bar. The pivot bar is supported from the frame by a shock absorber and a helical spring so that impacts transferred to the frame through the wheelchair wheels are partially decoupled from the movement of the seat. The movement of the seat is constrained in a single plane along the longitudinal axis of the wheelchair.

13 Claims, 4 Drawing Sheets

SUSPENSION FOR SEAT OF POWERED WHEEL CHAIR

BACKGROUND OF THE INVENTION

1. Field of Invention

This patent pertains to the art of wheelchairs and more particularly to the art of powered wheelchairs, and even more particularly to the art of suspending a seat over the frame of a powered wheelchair to cushion the occupant from impacts transferred to the frame through the wheels.

2. Description of Related Art

Powered wheelchairs, wheelchairs which provide motive force from storage batteries or other means, are old in the art. In some powered wheelchairs, pneumatic tires are used which help cushion the occupant from impacts occurring when the wheels strike obstacles such as curbs or other objects. In a conventional powered wheelchair, these impacts are transferred to the frame through the wheels. Because the seat is typically attached rigidly to the frame, the jarring effects of such impacts are felt by the occupant. Because the wheelchair occupant has some deficiency in motor control or strength in his lower extremities, the jarring effects of these impacts are especially difficult to handle.

For these and other reasons, applicants saw a need for a powered wheelchair which more effectively isolated or decoupled the occupant in the seat from the impacts encountered by the wheels.

The present invention contemplates a new and improved suspension system for a powered wheelchair which isolates the seat from the frame and wheels and provides a more comfortable and more stable ride.

SUMMARY OF THE INVENTION

More particularly, in accordance with the invention, a suspension system for a wheelchair comprises a frame, a hinge point, a pivot bar, and a seat. The hinge point is mounted on the frame. A pivot bar has first and second ends, the first end of the pivot bar rotatably attached to the hinge point. The seat is mounted on the pivot bar. The pivot bar is able to rotate about the hinge point in only one plane.

In accordance with another aspect of the invention, an elastic means for cushioning the seat from impulses to the frame is mounted between the frame and the pivot bar.

According to a still further aspect of the invention, a powered wheelchair comprises a frame and a plurality of wheels which are rotatably attached to and support the frame. A seat suitable for receiving the body of an associated occupant of the wheelchair is mounted to the frame. A first bracket is fixedly attached to the frame and comprises a pair of parallel plates with a hole therethrough. A pivot bar has a first and second end. The first end of the pivot bar is rotatably received between the parallel plates of the first bracket. The pivot bar extends generally horizontally over a lower member of said frame. The pivot bar is rotatable about said first bracket in a single plane. A bolt is selectively received between the holes in the parallel plates and the first bracket and the holes in the ball bearings of the first end of the pivot bar. A second bracket is fixedly attached to the lower member of the frame and comprises a pair of parallel plates with a hole therethrough. A damping means for damping oscillations of the pivot bar and seat has a first and second end. The first end of the damping means is fixedly attached to the second end of the pivot bar. The second end of the damping means is fixedly attached to the second bracket of the lower member of the frame. A spring member has first and second ends. The first end of the spring member is fixedly attached to the pivot bar at a point between the first end and the second end of the pivot bar. The second end of the spring member is fixedly attached to the lower member of the frame and the spring member is operatively associated with the pivot bar to deflect when the pivot bar rotates about the first bracket of rate of deflection of the spring is adjustable via an adjustment means. A first cylindrical sleeve is fixedly mounted on the lower member of the frame. A second cylindrical sleeve is fixedly mounted to a center of a bottom portion of the seat. The second cylindrical sleeve is slidably received within the first cylindrical sleeve. The damping means and spring member are effective to cushion the associated occupant from impacts transferred to the frame through the wheels.

One advantage of the present invention is improved isolation of the occupant from impacts to the wheelchair, wheels, frame and seat.

Still another advantage of the present invention is the isolation of the seat from the frame and the wheels. An alternate wheelchair suspension design involves trying to isolate the wheels from the frame, rather than the seat from the frame and the wheels.

Still another advantage of the invention is improved lateral stability for the seat. Since the occupant often has no use of his lower extremities, a stable secure seat will be more comfortable for the occupant.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts. A preferred embodiment of the invention will be described in detail in the specification and will be illustrated in the accompanying drawings which form a part of this specification and wherein.

DESCRIPTION OF THE PREFERRED EMBODIMENT

Figure 1:
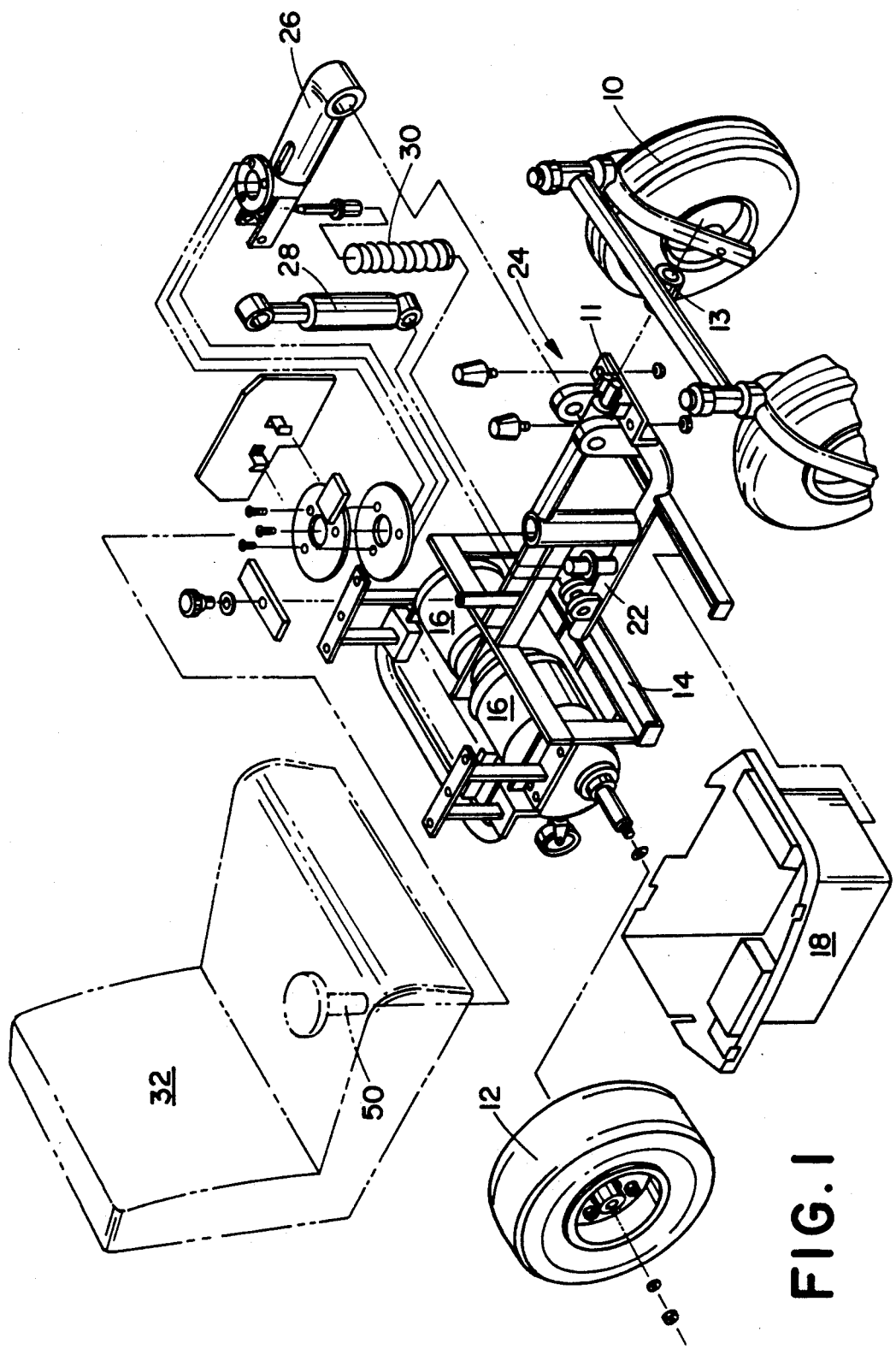
FIG. 1 is an exploded perspective view of a portion of a powered wheelchair featuring a suspension system according to the present invention with the seat shown in phantom.
Figure 2:
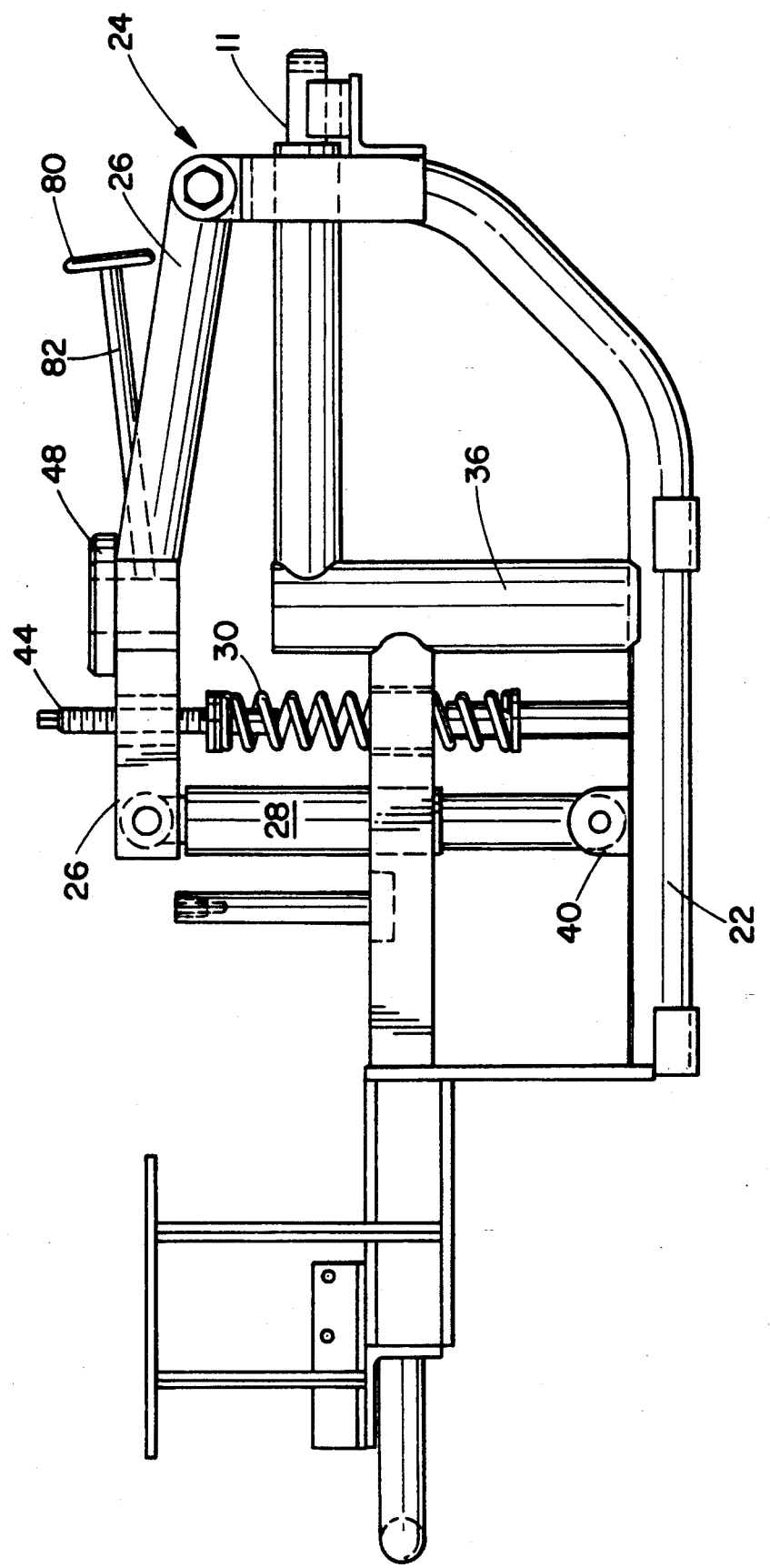
FIG. 2 is a side plan view of a suspension system according to the present invention.

Referring now to the drawings, wherein the showings are for purposes of illustrating a preferred embodiment and should not be construed as limiting the invention more narrowly than the claims, FIG. 1 shows an exploded perspective view of a powered wheelchair incorporating the suspension system of the current invention. Front wheels 10 and rear wheels 12 are connected to a frame 14. With reference to FIGS. 1 and 2, the front wheels 10 can be connected to frame 14 in any conventional way consistent with sound engineering judgment. In the preferred embodiment, the front wheels 10 are affixed to rod 11 via sleeve 13. The rear wheels 12 are driven by motors 16. The motors receive power from electric storage batteries which are encased in plastic enclosure 18.

The suspension system of the invention consists primarily of lower member 22 of the frame, hinge point 24, pivot bar 26, shock absorber 28, and helical spring 30.

Figure 3:
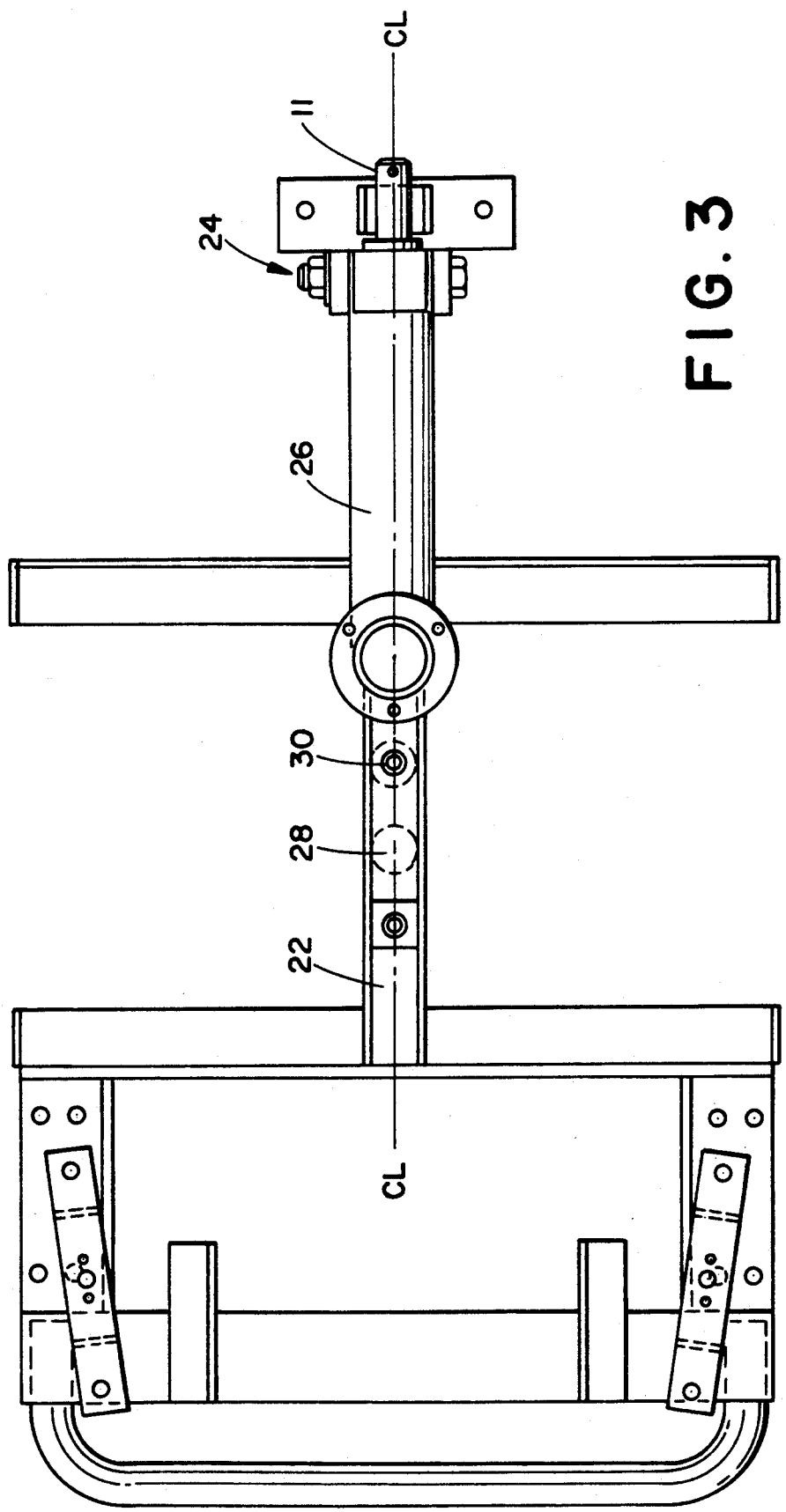
FIG. 3 is a top plan view of a suspension system according to the present invention.

With reference to FIGS. 1 and 3, it can be seen that the lower member 22, the hinge point 24, the pivot bar 26, the shock absorber 28, and the helical spring 30 are all centered along a line which bisects the seat 32.

With reference to FIG. 2, the spacing of the shock absorber 28, the helical spring 30, and the outer cylindrical sleeve 36 can be seen. Note that the shock absorber 28 is connected at one end to a bracket 40 mounted on the lower member 22, and at the other end mounted to an end of the pivot bar 26. The shock absorber 28 is preferably a conventional oil shock absorber. Its purpose is to dampen the oscillations occurring from impulses to the wheelchair frame.

With continuing reference to FIG. 2, a helical spring 30 is located between the shock absorber 28 and the outer cylindrical sleeve 36. The helical spring 30 functions as an elastic member which is deformed upon impacts to the frame and smooth such impacts, providing a more comfortable ride for the occupant by decoupling the seat movement from the movement of the frame. In the preferred embodiment, the spring 30 is helically wound at a diameter of 1.5 inches and a spring constant of 160 pounds per inch. Preferably, the spring 30 is adjustable through adjusting means 44. The shock absorber 28 and the helical spring 30 work together to provide a comfortable ride for the occupant without the need for adjusting the height of the seat for each individual occupant. For example, the spring stiffness may be adjusted by means of spring adjustment means 44. This results in the length of the spring changing, which would normally affect the height of the seat 32. Because the maximum height of the seat 32 is controlled by the extension of the shock absorber 28, the height of the seat 32 can never extend beyond the point where the shock absorber 28 is fully extended. As such, the spring characteristic can be adjusted via spring adjustment means 44 without affecting the height of the seat. For example, the seat 32 will be at the same height when set for a 300 pound occupant or a 100 pound occupant.

With continuing reference to FIG. 2, cylindrical sleeve 36 is mounted between the helical spring 30 and the hinge point 24. An upper collar 48 is mounted on the pivot bar 26 so that the center line of the outer cylindrical sleeve 36 is coaxial with the center line of the upper collar 48.

With reference to FIGS. 1 and 2, an inner cylindrical sleeve 50 is fixedly attached to the center of the bottom of seat 32. The inner cylindrical sleeve 50 is slidingly received within the upper collar 48 and the outer cylindrical sleeve 36. Seat tightening knob 80 helps secure the inner cylindrical sleeve 50 within the upper collar 48. Even though the clearance between the inner cylindrical sleeve 50 and the upper collar 48 is on the order of 0.005 inches, turning adjustment knob 80 until the shaft 82 is firmly pressed against the inner cylindrical sleeve 50 adds another measure of stability. The location of the inner cylindrical sleeve 50 at the center of the bottom of the seat 32 is important in that one of the objectives of the invention is to prevent a side-to-side wobbling of the seat due to impacts. Suspension systems which independently suspend each wheel from the frame can have tendencies to wobble laterally, especially when the wheels on only one side of the wheelchair hit a bump. Because the occupant does not have use of his lower extremities, this wobbling makes it difficult for the occupant to retain his balance in the seat. By placing the inner cylindrical sleeve 50 at the very center of the seat 32, such wobbling is minimized.

Other mechanisms are incorporated in applicants' invention to minimize the lateral wobbling. For example, with reference to FIG. 3, it is evident that the lower member 22, hinge point 24, pivot bar 26, shock absorber 28, helical spring 30, outer cylindrical sleeve 36, and inner cylindrical sleeve 50, are all located along the center line CL of the wheelchair. This arrangement contributes to the movement of the seat being constrained to the plane of the rotation of the pivot bar 26 about the hinge point 24.

Figure 4:
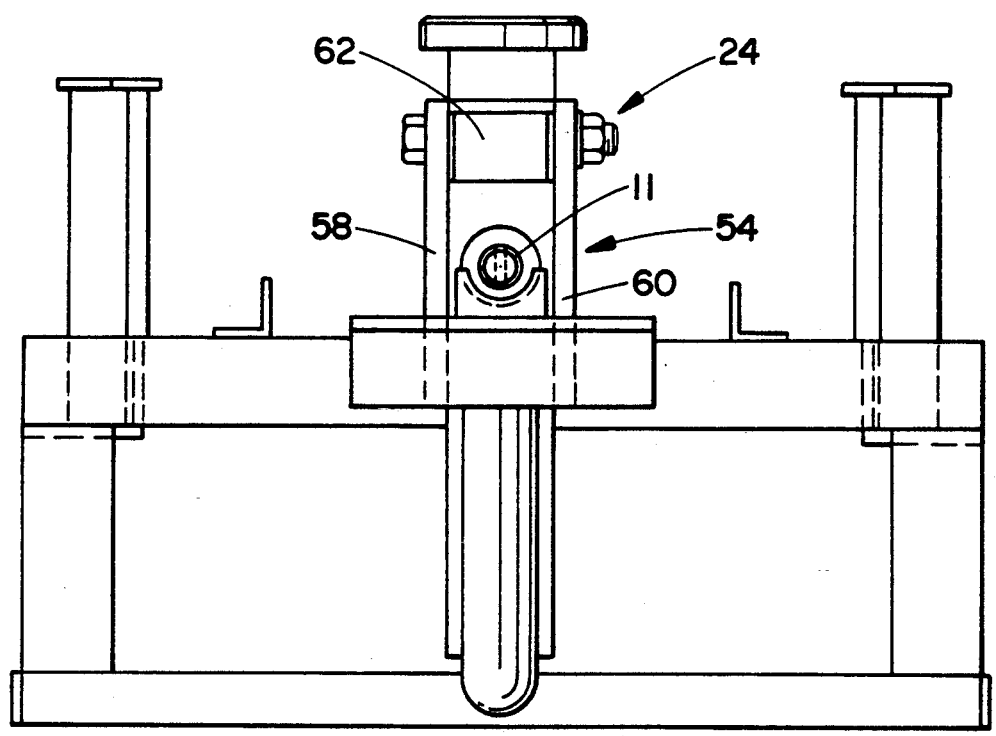
FIG. 4 is a front plan view of a suspension system according to the present invention.
Figure 5:
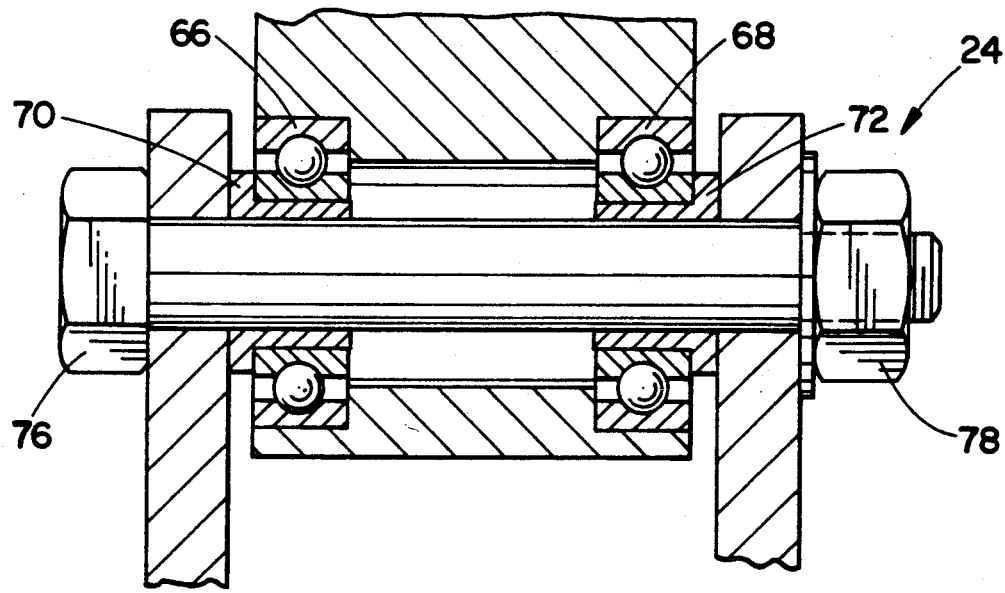
FIG. 5 is a cross-sectional view of the hinge point and bearings of the pivot arm according to the present invention.

With reference to FIGS. 4 and 5, it can be seen that a bracket 54 is made up of parallel plates 58, 60. These parallel plates 58, 60 receive between them the first end 62 of pivot bar 26. The spacing of parallel plates 58, 60 from the center line CL of the wheelchair add resistance to any moments about the longitudinal axis of the wheelchair. This resistance helps inhibit the lateral wobbling previously referred to.

With particular reference to FIG. 5, the structure of the hinge point 24 helps contribute to this lack of wobbling. Ball bearings 66, 68 are located within the first end 62 of the pivot bar 26. Bushings 70, 72 are located on the inner sides of parallel plates 58, 60. When the bolt 76 and nut 78 fastener is then tightened, it is tightened with a relatively high torque load. The relatively high torque load helps contribute to a very stable, firm hinge point 24 contributing to no wobble. The ball bearings 66, 68 are important to allow free movement of the pivot bar 26 about the hinge point 24. The horizontal orientation of the pivot bar 26, along with the design of the hinge point 24 are important features to allow a friction free movement of the seat 32 in response to impulses to the frame 14. Alternate designs might utilize a more vertically oriented suspension system. The applicants' experience has shown that some of the vertically oriented systems are prone to problems with friction and noise. While the orientation of the shock absorber 28 and the helical spring 30, as well as the outer and inner cylindrical sleeves 36, 50 are vertical, the pivot bar 26 is nearly horizontal and the aforementioned structure of the hinge point 24, with associated bearings 66, 68 provide for near friction free movement in response to impulses to the frame 14.

The invention has been described with reference to a preferred embodiment. Obviously, modifications and alterations will occur to others upon a reading and understanding of the specification. It is intended to include all such modifications and alterations insofar as they come within the scope of the appended claims or the equivalents thereof.

Having thus described the invention, it is now claimed:

1. A wheelchair having a suspension system with lateral stability, said wheelchair comprising:
    a frame, said frame having front, rear, and side edges;
    front and rear wheels rotatably attached to and supporting said frame, said front wheels being at said front edge of said frame and said rear wheels being at said rear edge of said frame, said front wheels being generally axially colinear and said rear wheels being generally axially colinear;

a hinge point mounted on said frame near said front edge of said frame, said hinge point comprising a pair of parallel plates fixedly attached to said frame, each plate having a hole therethrough;

a pivot bar having first and second ends, said first end of said pivot bar rotatably attached to said hinge point and having a hole therethrough, said pivot bar fitting closely between said parallel plates so that a distance between said parallel plates is approximately equal to a diameter of said pivot bar;

a bolt, said bolt received within said holes in said parallel plates and said hole in said first end of said pivot bar; and, a seat mounted on said pivot bar, said seat constrained to move only in a direction parallel to a plane containing one of said rear wheels.

2. A wheelchair as in claim 1 further comprising:
elastic means, said elastic means having a first end and a second end, said first end being fixedly attached to said pivot bar and said second end being fixedly attached to said frame, said elastic means decoupling said seat from impulses to said frame by elastically resisting rotation of said pivot bar about said hinge point.

3. A wheelchair as in claim 2 wherein said elastic means is a helical spring, said helical spring having a first end attached to said pivot bar and a second end attached to said frame.

4. A wheelchair as in claim 1 further comprising:
damping means for damping oscillations of said seat and pivot bar due to impulses to said frame by converting kinetic energy of said pivot bar to heat energy, said damping means having a first end affixed to said pivot bar and a second end affixed to said frame.

5. A wheelchair as in claim 4 wherein said damping means is a shock absorber.

6. A wheelchair as in claim 3 further comprising:
an adjustment means for adjusting a rate of deflection of said spring by changing a length of said spring, said adjustment means interposed between an end of said spring and said pivot bar.

7. A wheelchair as in claim 2 further comprising:
damping means for damping oscillations of said seat due to impulses to said frame, said damping means fixedly mounted between said second end of said pivot bar and said frame; and,
spring means for deflectingly absorbing oscillations of said seat due to impulses to said frame, said spring means fixedly mounted between said pivot bar and said frame at a position between said damping means and said first end of said pivot bar.

8. A wheelchair as in claim 2 wherein said elastic means is a single spring.

9. A wheelchair as in claim 4 wherein said damping means is a single shock absorber.

10. A wheelchair comprising:
a frame;
wheels rotatably attached to and supporting said frame;
a hinge point mounted on said frame;
a pivot bar having first and second ends, said first end of said pivot bar rotatably attached to said hinge point;
a seat mounted on said pivot bar;
attaching means for attaching said seat to said pivot bar, said attaching means being centered under said seat and comprising:
a first cylindrical sleeve fixedly mounted on said frame; and,
a second cylindrical sleeve mounted to said seat and slidably received within said first cylindrical sleeve.

11. A wheelchair comprising:
a frame;
wheels rotatably attached to and supporting said frame;
a hinge point mounted on said frame;
a pivot bar having first and second ends, said first end of said pivot bar rotatably attached to said hinge point;
a seat mounted on said pivot bar;
a pair of parallel plates fixedly attached to said frame, each plate having a hole therethrough;
said first end of said pivot bar fixedly received between said pair of parallel plates, said first end of said pivot bar having a hole therethrough, and having a pair of ball bearings aligned coaxially with said hole in said first end of said pivot bar; and
a bolt, said bolt received within said holes in said parallel plates and said hole in said first end of said pivot bar.

12. A powered wheelchair comprising:
a frame;
front and rear wheels rotatably attached to and supporting said frame, said front wheels being at said front edge of said frame and said rear wheels being at said rear edge of said frame, said front wheels being generally axially colinear and said rear wheels being generally axially colinear;
storage batteries supported by said frame;
an electric motor affixed to said frame, said motor powered by said storage batteries and selectively driving said wheels;
a seat;
a suspension means for suspending said seat above said frame, said suspension means fixedly attached to said frame and said seat, said suspension means partially isolating said seat from impacts transferred to said frame by said wheels, said seat constrained to move only in a direction parallel to a plane containing one of said rear wheels, said suspension means comprising:
a hinge point mounted on said frame near said front edge of said frame, said hinge point comprising a pair of parallel plates fixedly attached to said frame, each plate having a hole therethrough;
a pivot bar having a first and second ends, said first end of said pivot bar rotatably attached to said hinge point and having a hole therethrough, said pivot bar fitting closely between said parallel plates so that a distance between said parallel plates is approximately equal to a diameter of said pivot bar; and,
a bolt, said bolt received within said holes in said parallel plates and said hole in said first end of said pivot bar.

13. A powered wheelchair comprising:
a frame;
a plurality of wheels rotatably attached to and supporting said frame;
storage batteries supported by said frame;

an electric motor affixed to said frame, said motor powered by said storage batteries and selectively driving one of said wheels;

a seat suitable for receiving the body of an associated occupant of the wheelchair said seat mounted to said frame;

a first bracket fixedly attached to said frame, said first bracket comprising a pair of parallel plates with a hole therethrough;

a pivot bar having first and second ends, said first end of said pivot bar being rotatably received between said parallel plates of said first bracket, said first end having a hole therethrough alignable with said holes in said first bracket, said first end having a pair of ball bearings with holes therethrough, said holes being aligned with said holes in said parallel plate of said first bracket, said pivot bar extending generally horizontally over a lower member of said frame, said pivot bar rotatable about said first bracket in a single plane;

a bolt selectably received within said holes in said parallel plates of said first bracket and said holes in said ball bearings and said holes in said first end of said pivot bar;

a second bracket fixedly attached to said lower member of said frame, said second bracket comprising a pair of parallel plates with a hole therethrough;

a damping means for damping, said damping means having a first and second end, said first end of said damping means fixedly attached to said second end of said pivot bar, said second end of said damping means attached to said second bracket of said lower member of said frame;

a spring member, said spring member having first and second ends, said first end of said spring member attached to said pivot bar at a point between said first end and said second end of said pivot bar, said second end of said spring member fixedly attached to said lower member of said frame, said spring member operatively associated with said pivot bar to deflect when said pivot bar rotates about said first bracket, a deflection rate of said spring adjustable via an adjustment means;

a first cylindrical sleeve fixedly mounted on said lower member of said frame;

a second cylindrical sleeve fixedly mounted to a center of a bottom portion of said seat, said second cylindrical sleeve slidably received within said first cylindrical sleeve;

said damping means and said spring member effective to cushion said associated occupant from impacts transferred to said frame through said wheels.

* * * * *